(12) United States Patent  
Meidan et al.

(10) Patent No.: US 8,595,200 B2
(45) Date of Patent: Nov. 26, 2013

(54) FINDING SUSPICIOUS ASSOCIATION RULES IN DATA RECORDS

(75) Inventors: Abraham Meidan, Tel Aviv (IL); Ilia Vorobyov, Natanya (IL)

(73) Assignee: WizSoft Ltd., Tel Aviv (IL)

( * ) Notice: Subject to any disclaimer, the term of this patent is extended or adjusted under 35 U.S.C. 154(b) by 110 days.

(21) Appl. No.: 13/342,215

(22) Filed: Jan. 3, 2012

(65) Prior Publication Data
US 2013/0173565 A1 Jul. 4, 2013

(51) Int. Cl.
G06F 7/00 (2006.01)
G06F 17/00 (2006.01)

(52) U.S. Cl.
USPC .............. 707/694; 707/736; 707/803

(58) Field of Classification Search
USPC .......................................... 707/694
See application file for complete search history.

(56) References Cited

U.S. PATENT DOCUMENTS

| | | | |
|---|---|---|---|
| 6,311,173 B1 | 10/2001 | Levin et al. | |
| 6,542,881 B1 * | 4/2003 | Meidan et al. | 706/45 |
| 7,146,357 B2 * | 12/2006 | Suzuki et al. | 707/688 |
| 7,177,885 B2 * | 2/2007 | Isip et al. | 707/694 |
| 7,912,773 B1 * | 3/2011 | Subramanian et al. | 705/35 |
| 8,166,000 B2 * | 4/2012 | Labrie et al. | 707/694 |
| 8,171,001 B2 * | 5/2012 | Roth et al. | 707/694 |
| 2002/0133721 A1 * | 9/2002 | Adjaoute | 713/201 |
| 2003/0028507 A1 * | 2/2003 | Pauliks et al. | 707/1 |
| 2003/0120652 A1 * | 6/2003 | Tifft | 707/6 |
| 2004/0107205 A1 * | 6/2004 | Burdick et al. | 707/102 |
| 2006/0173924 A1 * | 8/2006 | Wotton et al. | 707/200 |
| 2007/0220604 A1 * | 9/2007 | Long | 726/22 |
| 2007/0282827 A1 * | 12/2007 | Levin | 707/5 |
| 2008/0140602 A1 * | 6/2008 | Roth et al. | 706/59 |
| 2008/0184105 A1 * | 7/2008 | Marcy et al. | 715/234 |
| 2009/0006283 A1 * | 1/2009 | Labrie et al. | 706/12 |
| 2009/0299767 A1 * | 12/2009 | Michon et al. | 705/3 |
| 2012/0197887 A1 * | 8/2012 | Anderson | 707/736 |

* cited by examiner

*Primary Examiner* — Binh V Ho
(74) *Attorney, Agent, or Firm* — The Law Office of Joseph L. Felber

(57) ABSTRACT

Suspicious activity may be found by automated methods and systems that analyze data records to find association rules correlating values in the fields of the records and then analyzing the association rules, as the association rules themselves can be indicative of improprieties. Thus, minimal human intervention is used to find improprieties in even very large datasets. If the data records are records of sales transactions, the finding and the analyzing of association rules as disclosed can flag suspicious-appearing transactions that may have resulted from improprieties, such as human mistakes or intentional frauds. Instructions for performing the disclosed analyses may be stored on non-transitory storage media for access by systems to execute the automated methods.

11 Claims, 6 Drawing Sheets

| SALES FOR ASTOR TRANSMISSION BRACKET - MODEL 34c | | | | | |
|---|---|---|---|---|---|
| TRANSACTION NO. | TRANSACTION DATE | CUSTOMER | SALES PERSON | SALES PRICE | ... |
| 1 | 20111031 | John Smith | R. Cohen | $1590.00 | ... |
| 2 | 20111031 | Jane Doe | T. Nguyen | $1625.00 | ... |
| 3 | 20111101 | John Q. Public | V. McCall | $1090.50 | ... |
| ⋮ | ⋮ | ⋮ | ⋮ | ⋮ | ⋮ |

FIG. 1 - BACKGROUND ART

| SALES RECORDS | | |
|---|---|---|
| CUSTOMER | DISCOUNT | FIELD 3 |
| John Smith | 20% | ... |
| John Smith | 20% | ... |
| John Smith | 20% | ... |
| John Smith | 20% | ... |
| John Smith | 20% | ... |
| Jane Doe | 15% | ... |
| Jane Doe | 10% | ... |
| Jane Doe | 12% | ... |
| Jane Doe | 14% | ... |
| John Q. Public | 15% | ... |
| John Q. Public | 15% | ... |
| John Q. Public | 15% | ... |
| John Q. Public | 15% | ... |
| John Q. Public | 15% | ... |
| John Q. Public | 15% | ... |
| Debra Keys | 20% | ... |

FIG. 2A

| SALES RECORDS | | |
|---|---|---|
| CUSTOMER | DISCOUNT | FIELD 3 |
| John Smith | 20% | ... |
| John Smith | 20% | ... |
| John Smith | 20% | ... |
| John Smith | 20% | ... |
| John Smith | 20% | ... |
| Jane Doe | 15% | ... |
| Jane Doe | 10% | ... |
| Jane Doe | 12% | ... |
| Esther Fine | 14% | ... |
| John Q. Public | 15% | ... |
| John Q. Public | 14% | ... |
| John Q. Public | 10% | ... |
| John Q. Public | 12% | ... |
| John Q. Public | 12% | ... |
| John Q. Public | 9% | ... |
| Debra Keys | 20% | ... |

FIG. 2B

| SALES RECORDS |||
| :---: | :---: | :---: |
| TRANSACTION NO. | DISCOUNT (%) | EXTENDED WARRANTEE? |
| 1 | 12 | Yes |
| 2 | 13 | Yes |
| 3 | 13 | Yes |
| 4 | 13.6 | No |
| 5 | 14 | No |
| 6 | 18.3 | No |
| 7 | 19 | No |
| 8 | 20 | No |
| 9 | 20.5 | No |
| 10 | 20.9 | No |
| 11 | 24 | Yes |
| 12 | 24.3 | No |
| 13 | 25 | Yes |
| 14 | 25.8 | No |
| 15 | 27.9 | No |
| 16 | 28.3 | Yes |
| 17 | 29 | No |
| 18 | 29.1 | No |

FIG. 4

FINDING SUSPICIOUS ASSOCIATION RULES IN DATA RECORDS

BACKGROUND

A business enterprise tracking its sales will easily acquire large amounts of repetitive-type data. An example of such data is represented in the table shown in FIG. 1. In this representation, the fields "TRANSACTION NO.," "TRANSACTION DATE," "CUSTOMER," "SALESPERSON," and "SALES PRICE" of three records are visible (those of transaction numbers 1-3), but there are many more fields and records.

The data in FIG. 1 show that two sales for an automobile part (a transmission bracket) on October 31 are for close to the same price, but a sale on the next day had a price that was significantly lower. On one hand, many factors could explain this, such as that the prices offered to the public are perhaps generally lower in November or perhaps that particular customer was granted a discount due to a special relationship with the vendor.

On the other hand, an auditor unfamiliar with a policy of offering lower prices in November or a special relationship with a particular customer may suspect that the discounted sales price was a result of an impropriety. For example, the associated salesperson many have improperly granted the discount accidentally, as a result of misinformation about the customer's status or about a promotional sale, or even on purpose. Auditors, forensic investigators, and data-quality managers familiar with the business may with experience develop a sense for recognizing potentially fraudulent data or data indicative of a mistake resulting from incorrect data entry, staff members misunderstanding operating guidelines, etc.

As the amount of data grows, though, it becomes more difficult to catch fraud and error by human inspection, and accordingly automated tools have been developed to recognize suspicious data. One way to recognize potential frauds and errors begins by generating a report of filtered and sorted data. An example report could be based on a rule to list all transactions in which the discount in a sales price is above a certain threshold, such as 40 percent. When an auditor sees transactions flagged as having discounts greater than 40 percent, he can decide whether to investigate whether those are proper transactions.

However, a limitation of such a technique to find frauds and errors is that only a pre-determined type of frauds or errors can be found. That is, in the previous example, improper discount of greater than 40 percent was the subject of investigation only because a human decided to establish a rule to check for such a high discount. Consider the more complex situation that discounts up to 40 percent are acceptable in November, but only if the salesperson V. McCall (FIG. 1) granted the discount. More specifically, salespersons R. Cohen and T. Nguyen are not authorized to grants discounts in November that are greater than 20 percent.

Accordingly, in the example, the rule to flag discounts greater than 40 percent will be ineffective for catching a November transaction by salesperson R. Cohen, if the discount for one of her transactions was 30 percent. That is, until a human decides to establish another rule that will flag November transactions of R. Cohen having discounts greater than 20 percent (as opposed to 40 percent), her transactions having a 30 percent discount will not be flagged for suspicion of an impropriety.

To ease the burden of having to think of and to establish so many rules to flag as much suspicious data as possible, data-mining algorithms have been developed to find patterns in identified improper transactions and then to establish rules based on those patterns. That is, patterns found to be associated with known improper transactions are used to find improper transactions in new data. With reference to the examples above, data regarding the improper transaction of R. Cohen may be input into a data-mining algorithm (along with other data of that type), and then the algorithm can establish a rule to flag similar transactions. With such algorithms, transactions need only be indicated as improper, and then the algorithm can determine the appropriate rule to find similar improper transitions. (Although the examples described here relate to simple rules that a human might establish with minimal difficulty, the algorithm can determine effective rules that are not so simple to discern by humans responsible for large amounts of data.)

Although such data-mining algorithms ease the human burden by developing analysis rules given improper transaction data as input, their effectiveness is limited to only establishing rules based on transactions that are identified as improper. That is, the data-mining algorithms do not establish rules for flagging suspicious transactions that have no examples identified previously. There still needs to be a way to analyze data for irregular patterns, even patterns that have not in the past already been associated with improper transactions.

To a limited extent, data-mining algorithms have been developed to analyze transaction data for patterns, to establish rules based on those patterns, and then to flag as suspicious transactions do not conform to the rules. Such algorithms though are inherently based on the assumption that an impropriety, whether based on fraud or unintentional error, is an exception to a rule and does not conform to the established pattern of the majority. For example, if 97 percent of the November transactions were discounted by no more than 25 percent, a single transaction made by salesperson V. M$^c$Call with a discount of 30 percent would likely be flagged as suspicious.

However, if instead 25 percent of the November transactions of V. M$^c$Call were discounted by 30 percent, those transactions would not as likely be flagged as suspicious. That is because, although the transactions may very well be improper, there are so many of them that they do not appear to the algorithm as suspicious. In fact, the algorithm may instead even establish a rule based on transactions by salesperson R. Cohen that considers the transaction discounted by 30 percent to be an acceptable transaction. The present inventors are unaware of any conventional way to flag suspicious patterns of data, even if the suspicious activity is prevalent.

SUMMARY

In view of the shortcomings of the prior art, the present inventors developed an automated way to find improprieties in very large amounts of data. Embodiments of the present invention find association rules and then determine whether a rule itself should be deemed suspicious.

The invention may be embodied as a method of operating a data processor to process data records to discover a suspicious association rule. The method includes: receiving data records that had been stored on a data storage device, the data records having at least a first field and a second field; and analyzing the data records to find at least one association rule. The method also includes, for an association rule found that correlates a first value in the first field of a record as a condition with a second value in the second field of the record as a result, indicating that the association rule is suspicious if:

only one association rule is found having the first value in the first field; there exist at least a first predetermined minimum number of different alpha-numeric strings or segments of real numbers in the first field, for each of those strings or segments, there exist at least a second predetermined minimum number of records having in the first field the string or the real numbers of the segment, respectively; and no other association rules are found that correlate any value in the first field with a value in the second field.

The invention may be embodied as an alternate method of operating a data processor to process data records to discover a suspicious association rule. The method includes: receiving data records that had been stored on a data storage device, the data records having at least a first field and a second field; and analyzing the data records to at least one multiple association rule. The method also includes, for an association rule found that correlates a first value in the first field of a record as a condition with a second value in the second field of the record as a result, indicating that the association rule is suspicious if: only one or at least a first predetermined minimum number of other association rules are found having the first value in the first field; there exist at least a second predetermined minimum number of different alpha-numeric strings or segments of real numbers in the first field and, for each of those strings or segments, there exist at least a third predetermined minimum number of records having in the first field the string or the real numbers of the segments, respectively; other association rules are found that correlate a value in the first field as a condition; and all of said other association rules correlate the first field with a third value in the second field.

The invention may also be embodied as a system for processing data records to discover a suspicious association rule. The system has a processing unit and a memory unit. The memory unit holds instructions that, when executed by the processing unit, cause the processing unit to: (a) receive data records that had been stored on a data storage device, the data records having at least a first field and a second field; (b) analyze the data records to find at least one association rule; and (c) for an association rule found that correlates a first value in the first field of a record as a condition with a second value in the second field of the record as a result, indicate that the association rule is suspicious if: only one association rule is found having the first value in the first field; there exist at least a first predetermined minimum number of different alpha-numeric strings or segments of real numbers in the first field and, for each of those strings or segments, there exist at least a second predetermined minimum number of records having in the first field the string or the real numbers of the segment, respectively; and no other association rules are found that correlate any value in the first field with a value in the second field.

The invention may be embodied as an alternate system for processing data records to discover a suspicious association rule. This system also has a processing unit and a memory unit. The memory unit of this embodiment holds instructions that, when executed by the processing unit, cause the processing unit to: (a) receive data records that had been stored on a data storage device, the data records having at least a first field and a second field; (b) analyze the data records to find at least one association rule; and (c) for an association rule found that correlates a first value in the first field of a record as a condition with a second value in the second field of a record as a result, indicate that the association rule is suspicious if: only one or at least a first predetermined minimum number of other association rules are found that having first value in the first field; there exist at least a second predetermined minimum number of different alpha-numeric strings or segments of real numbers in the first field and, for each of those strings or segments, there exist at least a third predetermined minimum number of records having in the first field the string or the real numbers of the segment, respectively; other association rules are found that correlate a value in the first field as a condition; and all of said other association rules correlate the first field with a third value in the second field.

The invention may further be embodied as a non-transitory machine readable storage medium containing instructions associated with discovering suspicious association rules. The instructions when executed cause the following: receiving data records that had been stored on a data storage device, the data records having at least a first field and a second field; and analyzing the data records to find at least one association rule. The instructions also cause, for an association rule found that correlates a first value in the first field of a record as a condition with a second value in the second field of the record as a result, indicating that the association rule is suspicious if: only one association rule is found having the first value in the first field; there exist at least a first predetermined minimum number of different alpha-numeric strings or segments of real numbers in the first field and, for each of those strings or segments, there exist at least a second predetermined minimum number of records having in the first field the string or the real numbers of the segment, respectively; and no other association rules are found that correlate any value in the first field with a value in the second field.

The invention may be embodied as an alternate non-transitory machine readable storage medium that contains instructions associated with discovering suspicious association rules. The instructions when executed cause the following: receiving data records that had been stored on a data storage device, the data records having at least a first field and a second field; and analyzing the data records to find at least one association rule. The instructions also cause, for an association rule found that correlates a first value in the first field of a record as a condition with a second value in the second field of the record as a result, indicating that the association rule is suspicious if: only one or at least a first predetermined minimum number of other association rules are found having the first value in the first field; there exist at least a second predetermined minimum number of different alpha-numeric strings or segments of real numbers in the first field and, for each of those strings or segments, there exist at least a third predetermined minimum number of records having in the first field the string or the real numbers of the segments, respectively; other association rules are found that correlate a value in the first field as a condition; and all of said other association rules correlate the first field with a third value in the second field.

Embodiments of the present invention are described in detail below with reference to the accompanying drawings, which are briefly described as follows:

BRIEF DESCRIPTION OF THE DRAWINGS

The invention is described below in the appended claims, which are read in view of the accompanying description including the following drawings, wherein:

FIG. 1 provides a background example of data relating transactions dates, customers, salespersons, and sales prices;

FIGS. 2A and 2B provide example data records in which embodiments of methods of the present invention find association rules and determine whether those association rules are suspicious;

FIG. 4 provides example data records in which real numbers in some of the fields are segmented according to embodiments of the invention;

DETAILED DESCRIPTION

Figure 3:
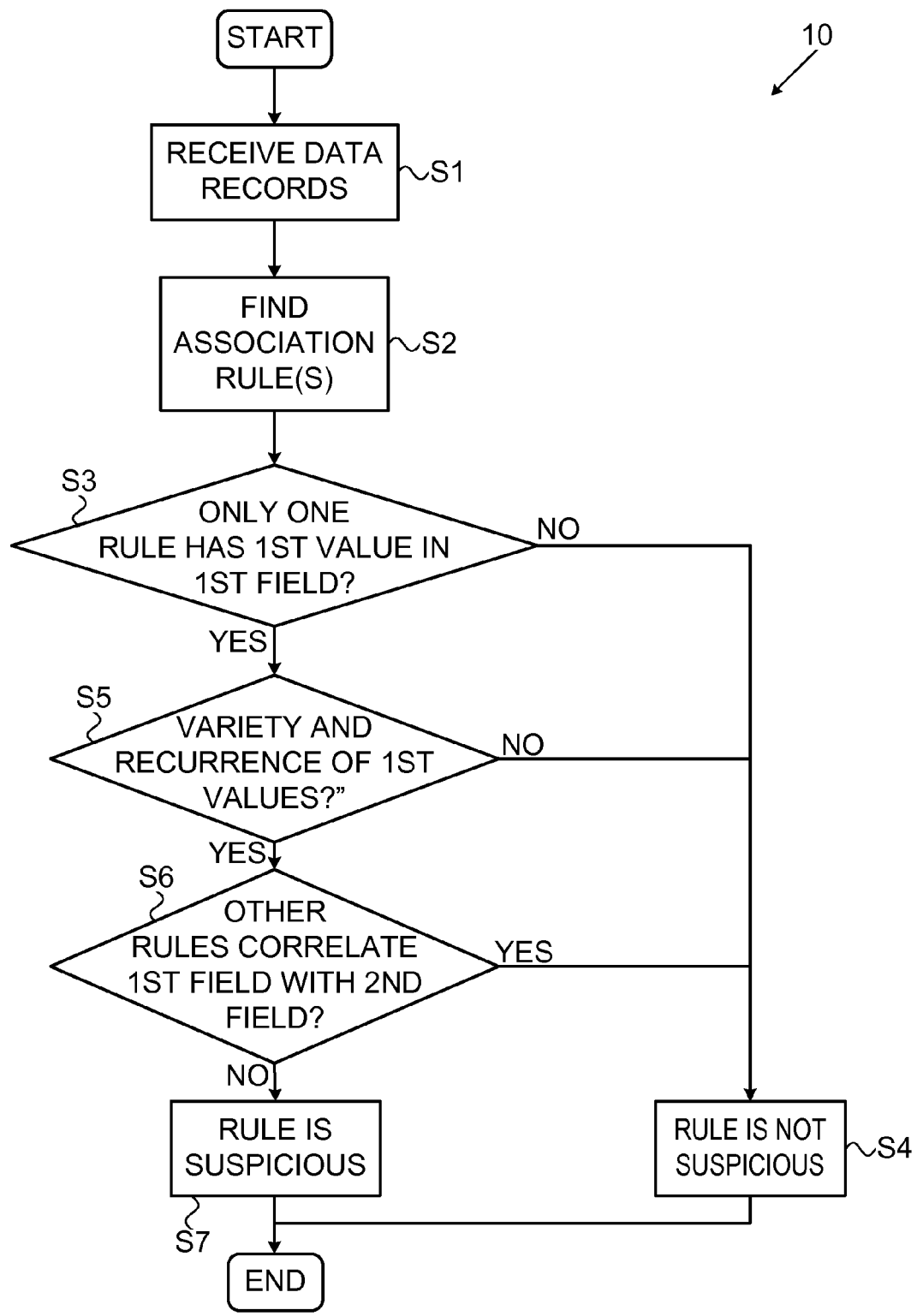
FIG. 3 presents a flowchart used to describe an example of the invention embodied as a method.

The invention summarized above and defined by the claims below will be better understood by referring to the present detailed description of embodiments of the invention. This description is not intended to limit the scope of claims but instead to provide examples of the invention. Described first are examples of the invention embodied as methods. Described next are examples of the invention embodied as systems. Described after that are examples of the invention embodied as storage media.

In general, regarding embodiments of the invention, data records may be analyzed to find patterns that can be expressed as association rules. The term "association rule" is a term of art, which refers to a relationship between fields of a particular data record within a set of data records (a dataset). Association rules can be expressed as if/then statements, as demonstrated below, and they can find relationships between perhaps seemingly unrelated data in an information repository. Embodiments of the present invention find association rules in datasets and analyze them to determine if any are "suspicious," that is, if any particular associated rules raise a concern that, based on the dataset, a fraud or an error may have occurred. An example of a fraud could be one customer regularly receiving higher sales discounts than any other customer. An example mistake could be a particular customer receiving a discount after a sales period has ended, because the salesperson granting the sale did not realize that the sale period was over.

Reference is now made to FIGS. 2A and 2B for a discussion of one criterion for determining whether an association rule is suspicious. The datasets each have sixteen records of three fields each. The dataset of FIG. 2A shows five records in which customer John Smith (in the "CUSTOMER" field) received a 20 percent discount (shown in the "DISCOUNT" field), four records in which customer Jane Doe received a different discount each time, six records in which customer John Q Public received a 15 percent discount and one record for customer Debra Keys. The dataset of FIG. 2B resembles the dataset of FIG. 2A, except that there are only three records for Jane Doe, there is a record for Esther Fine, and, out of the six sales to customer John Q Public, only two times did he receive the same discount.

An association rule algorithm can be implemented to process the data records of FIGS. 2A and 2B to find association rules. Association rule algorithms are known and used in data mining and used to apply association rule learning to discover relationships between variables in large databases. Example association rule algorithms include Apriori, Eclat, and FP-Growth (frequent pattern growth), GUHA, and OPUS.

An association rule algorithm operating on the dataset of FIG. 2A may find the following two association rules:

If customer is "John Smith", then discount is "20 percent".
If customer is "John Q. Public", then discount is "15 percent".

The syntax of these association rules is:

If [a value in one field of a record] is <a condition>,
then [the value in another field of the record] is <a result>.

The association rule algorithm did not find any association rules with "Jane Doe" or "Debra Keys" as conditions. This is not surprising, as Jane Doe never had the same discount twice, and Debra Keys appears in only one record. It is noted that these examples are simplified to work with only sixteen records. It is common, though, to run association rule algorithms on data sets having millions of records.

The same association rule algorithm, with the same settings for tolerances, flags, limits, etc., operating on the dataset of FIG. 2B may find only the following one association rule:

If customer is "John Smith", then discount is "20 percent".

John Q. Public did get the same discount twice, instead of six times as in the dataset of FIG. 2B, but the association rule algorithm was not set to consider two occurrences enough to establish an association rule.

According to some embodiments of the invention, the result that only one association rule was found for the data of FIG. 2B raises a suspicion of an impropriety (a fraud or a mistake). The rule is suspicious, because of a criterion indicating suspicion when only one rule relates a value in the customer field with a value in the discount field. (It would not matter whether other association rules for found, for example relating a value in the customer field with a value in "Field 3".)

One example embodiment implementing the above criterion to discover suspicious association rules is described with reference to the flowchart 10 of FIG. 3. The embodiment is a method of operating a data processor to process data records to discover a suspicious association rule. A "data processor" in this context broadly refers to typical computers, whether mainframe or personal computers, workstations, such as stand-alone units and servers accessible via a local area network (LAN) or the Internet, or any other processing devices capable of executing algorithms that process the data within data records to find association rules. The data processors may run any standard operating system, such as Windows XP, Windows 7, Windows 2008, Unix, and Macintosh operating systems as non-limiting examples.

The first step of the method is to receive data records that had been stored on a data storage device. (Step S1.) Examples of such receiving include a CPU of a computer retrieving data records from the computer's own storage or a server receiving data records though a network, such as the Internet or a LAN, which is in communication with another computer having a storage device that stores the data records thereon. The data records processed according to this method have at least two fields, as there needs to be two fields for an association rule to have a condition and result (using the terminology of the association rule syntax presented above). The data records of FIGS. 2A and 2B are examples of such data records (although the present embodiment was developed with a focus on much larger datasets). Example data storage devices that store the data records include PC or server hard drives, such as SATA hard drives or flash memory SSDs (solid state drives), CDs or DVDs, and USB flash drives.

The next step is to analyze the received data records to find at least one association rule. (Step S2.) (If no association rules were found, it follows that no suspicious association rules were found. This process would not need to continue.) With reference to discussion above, association rules can be found in step S2 by executing algorithms that apply association rule learning to the received data records.

The next steps need to be performed for each association rule found in order to determine whether the particular association rule is suspicious. (For clarity of drawing, the following steps are represented once in FIG. 3, but it is understood the steps are duplicated for each rule to be tested.) The discussion that follows references for the rule under analysis a "first value" of a "first field" and a "second value" of a "second field." For purposes of referencing the datasets of FIGS. 2A and 2B and the associated association rules provided above as example data on which the steps of the present method are performed, the "customer" field shall be regarded as the first field and the "discount" field shall be regarded as the second field. That is, the association rules "If customer is 'John Smith', then discount is '20 percent'" for the datasets of FIGS. 2A and 2B and the association rule "If customer is 'John Q. Public', then discount is '15 percent'" for the dataset of FIG. 2A (and not of FIG. 2B) correlate "John Smith" and "John Q. Public" as values in first fields with "20 percent" and "15 percent" as values in second fields.

The method proceeds with an inquiry as to whether only one association rule was found having the first value in the first field. (Step S3.) If the answer is negative, the association rule is deemed to be not suspicious (Step S4), and the process ends for this rule. If other association rules found in step S2 have not yet been checked, the process resumes at step S3 for those remaining rules.

In the answer to the inquiry of step S3 is affirmative, it is then inquired as to whether there is enough variety and enough recurrence of the first values in the first fields of the association rules found in step S2. That is, the method progresses with an inquiry as to whether there exist at least a first predetermined minimum number of different alpha-numeric strings or segments of real numbers in the first field that, for each of those strings or segments, there exist at least a second predetermined minimum number of records having in the first field the string or the real numbers of the segment, respectively. (Step S5.) In some implementations of the present method, the user may select and later revise the values of the first and second predetermined minimum numbers as desired, for example, as expected to produce useful results based on empirical experience or on guidance provided by others.

If the answer to the inquiry of step S5 is negative, the association rule is deemed to be not suspicious (Step S4), and the process ends for this rule. If other association rules found in step S2 have not yet been checked, the process resumes at step S3 for those remaining rules.

To illustrate an example of the inquiry of step S5, reference is made again to the data sets of FIGS. 2A and 2B and their corresponding association rules:

If customer is "John Smith", then discount is "20 percent" (rule No. 1)

If customer is "John Q. Public", then discount is "15 percent" (rule No. 2)

If, in the analysis of both datasets, the first predetermined minimum number is set at "4", both rules Nos. 1 and 2 for the dataset of FIG. 2A and rule No. 1 for the dataset of FIG. 2B remain under scrutiny as suspicious (but may be removed later from scrutiny depending on the value set for the second predetermined minimum value, as discussed later). If instead the first predetermined minimum number is set at "5", only rule No. 1 of the dataset of FIG. 2B remains under scrutiny.

By setting a first predetermined minimum number appropriately, this analysis can avoid deeming rules suspicious when they are not really connected to improper activity. For example, consider a dataset of twenty records with "John Smith" as the customer and only one record with "Jane Doe" as the customer. All twenty-one records indicate that John Smith and Jane Doe receive 20 percent discounts, and this conforms to a business's policy. Potentially, the transactions with "John Smith" as the customer (the first field) would become the subject of an association rule. However, the transaction with "Jane Doe" as the customer would not become the subject of an association rule, because there is only one such record as opposed to twenty records. A user executing the present method to analyze this dataset would not want the association rule for "John Smith" flagged as suspicious, but such would happen if the first predetermined minimum number were not set above "two."

Assuming that the requirement is met for both rules No. 1 and No. 2 for a first predetermined minimum number of different alpha-numeric strings (or segments of real numbers) in the first field, if, in the analysis of both datasets, the second predetermined minimum number is set at "5", both rules Nos. 1 and 2 for the dataset of FIG. 2A and rule No. 1 of the dataset of FIG. 2B remain under scrutiny as suspicious. If instead the second predetermined minimum number is set at "6", only rule No. 2 of the dataset of FIG. 2A remains under scrutiny, and rule No. 1 for both datasets is deemed not suspicious and not scrutinized further.

Setting the second predetermined minimum number appropriately can also prevent an analysis from deeming rules suspicious when instead they are not connected to improper activity. For example, consider a dataset of a hundred records, John Smith receives a 20 percent discount three times and John Q. Public receives a discount forty times. Also, consider that both John Smith and John Q. Public as customers are conditions of association rules and their discounts are the results. A user executing the present method would not want the association rule for "John Smith" flagged as suspicious, because there are only three records supporting the rule. By setting the second predetermined minimum number to "four" or greater, a rule like this would not be flagged as suspicious, but the rule for John Q. Public would still be flagged.

When after step S5 an association rule remains under scrutiny as suspicious, the method continues with an inquiry as to whether any other association rules were found that correlate a value (any value) in the first field with a value in the second field. (Step S6.) Reference is made again to the example datasets of FIGS. 2A and 2B, with the assumption that the first and second predetermined minimum numbers of step S4 were set so that both rules No. 1 and No. 2 remained under scrutiny. Regarding the dataset of FIG. 2A, because for each rule there would be another association rule correlating a value in the "customer" field with a value in the "discount" field, each rule would be deemed not suspicious (step S4). In contrast, regarding the dataset of FIG. 2B, which only has association rule No. 1, this rule would be deemed suspicious. (Step S7.) That is, a suspicion arises that the transactions associated with the rule are the result of fraud or error, because no other rule indicates a relationship of values in the first and second fields.

After the last association rule under scrutiny is either deemed suspicious (step S7) or not suspicious (step S5), the process ends.

The above examples in the discussion of the method of FIG. 3 use alpha-numeric strings as values in the first fields, but the method may also be implemented when the values in the first field are real numbers (as is the case for the second field in the above examples). Reference is now made to the example dataset of FIG. 4, which provides the sales records of eighteen transactions. For each transaction, the dataset indicates the discount a customer received (a "first field") and whether the customer received an extended warrantee with the sale (a "second field").

In this example, the salespersons apparently granted discounts without computing amounts based on even percentage reductions but perhaps instead by even price reductions ("$50 discount", "$100 discount", . . . ). If these records were analyzed in the same way as if the first fields contained alpha-numeric strings, only transactions Nos. 2 and 3 would be a case in which two records had the same interesting value in the first field.

Accordingly, when the data in the first fields are real numbers, that data is segmented into groups of "nearly-equal" values. Segmentation algorithms are known in the art, for example, as discussed in U.S. Pat. No. 6,311,173, the disclosure of which is incorporated by reference in its entirety. Known segmentation algorithms are also discussed in Martin Ester, Hans-Peter Kriegel, Jorg Sander, Xiaowei Xu (1996), "A density-based algorithm for discovering clusters in large spatial databases with noise" and in Evangelos Simoudis, Jiawei Han, Usama M. Fayyad, Proceedings of the Second International Conference on Knowledge Discovery and Data Mining (KDD-96). AAAI Press, 1996. pp. 226-231. In the present example, the data indicating the discounts for the transaction may be segmented into real value ranges of "10-15", "15-21", "21-26", and "26-30", as shown in FIG. 4 by horizontal dashed lines. The association rule algorithm in this example finds the following rule:

If discount is "15-21", then extended warrantee is "no".

That is, segmentation is used in step S2, finding association rules.

Segmentation real numbers is also used in step S5, the inquiry as to whether there is enough variety and enough recurrence of the first values in the first fields of the association rules found in step S2. The segmentation will not necessarily result in the same segments as that found for step S3. Perhaps the segments for step S5 will be "10-21" and "21-30" instead, for example. If though the segmentation happens to be the same, that is, "10-15", "15-21", "21-26", and "26-30," the number of different segments of real numbers in the first field is four (compared to the first predetermined minimum number), and, for each of those segments, there exist five, five, four, and four records, respectively (compared to the second predetermined minimum number), in those fields.

Additional embodiments of the invention address scenarios such the following example, in which an association rule algorithm finds the following association rules from a set of data records:

If customer is "John Smith", then discount is "20 percent"
If customer is "John Smith", then discount is "15 percent"
If customer is "John Q. Public", then discount is "15 percent"
If customer is "Philip Jones", then discount is "15 percent"
If customer is "Mary Smith", then discount is "15 percent"
If customer is "Rajeesh Patel", then discount is "15 percent"
If customer is "Donna Robinson", then discount is "15 percent"
If customer is "Lisa Ono", then discount is "15 percent"

As can be seen, there is one customer who regularly received a discount of 20 percent sometimes and 15 percent other times, while every other customers for whom a rule resulted received a discount of 15 percent. A human auditor reviewing only these eight association rules might routinely deem the first association rule suspicious. However, an automated method of discovering suspicious association rules is needed for large numbers of association rules (significantly more than eight) that correlate a large number of different fields (as opposed to correlating only two fields).

An embodiment of the invention implementing a criterion to discover suspicious association rules in a scenario such as that of the preceding example is now described with reference to the flow chart 12 presented in FIG. 5. The embodiment is another method of operating a data processor to process data records to discover a suspicious association rule. A "data processor" in this context can be the same data processors referenced by the method of FIG. 3.

As in the method of FIG. 3, the first step is to receive data records that had been stored on a data storage device. (Step S1.) This step in the present method may be implemented in the same fashion as in the other method as described above. For example, the data records may be received from a data storage device accessed through a network, or they may be received by a computer's processing unit from the computer's own storage upon which the data records reside.

Similarly to the method of FIG. 3, the second step is to analyze the data records to find at least one association rule. (Step S2.) An association rule algorithm may be executed as discussed above with reference to step S2 of the method of FIG. 3 as a way of finding the association rules.

The next steps need to be performed for each association rule found in order to determine whether the particular association rule is suspicious. (For clarity of drawing, the steps following step S2 are represented only once in FIG. 5, but it is understood the steps are duplicated for each rule to be tested.) For purposes of referencing the eight association rules in the example above as example data on which the steps of the present method are performed, the "customer" field shall be regarded as the first field and the "discount" field shall be regarded as the second field. That is, the first association rule "If customer is 'John Smith', then discount is '20 percent,'" for example, correlates "John Smith" as the value in the first field as the condition with "20 percent" as the value in the second field as the result.

The method proceeds with an inquiry as to whether at least a first predetermined minimum number of other association rules are found (that is, in addition to the association rule being tested) that correlate the first value in the first field as a condition with any value in the second field as a result. (Step S3.) For the example above in which two of the eight association rules found have "John Smith" as the value in the first field, when the first of these rules is tested, there is one other association rule that correlates the first value in the first field with a value in the second field. Thus, if the first predetermined minimum number were set at "2" or above, the result of the step S3 inquiry would be negative, and the rule would be deemed not suspicious. (Step S4.) For this result, the analysis for that rule would then end. If instead the first predetermined minimum number were set at "1" (or even "zero"), the result of the inquiry would be affirmative, and the process flow would continue to a step S5.

Step S5 is an inquiry as to whether there is enough variety and enough recurrence of the first values in the first fields of the association rules found in step S2. That is, the method progresses with an inquiry as to whether there exist at least a second predetermined minimum number of different alpha-numeric strings or segments of real numbers in the first fields of the data record and, for each of those strings or segments, there exist at least a third predetermined minimum number of records having in the first field the particular string or real numbers of the segments of the rule under examination, respectively. This step is analogous to step S3 of the embodiment of FIG. 3. (In that earlier embodiment, the first field is tested as to whether it has what is labeled a "first" predetermined minimum number of different values, and it is tested whether there exist at least what is labeled a "second" predetermined minimum number of records having a particular value in the first field.). If the values in the first field are real numbers instead of alpha-numeric strings, they are segmented as discussed above regarding the embodiment of FIG. 3.

If the result of the inquiry of step S5 is negative, the rule is deemed not suspicious (step S4), and the analysis for that rule ends. If the result of the inquiry is affirmative, the process flow continues to a step S6.

Step S6 is an inquiry as whether other association rules are found that correlate a value in the first field as a condition. (This step differs from step S3, which checks whether other association rules correlate a particular first value in the first field as a condition.) If the result of the inquiry is negative, the rule is deemed not suspicious (step S4), and the analysis for that rule ends. With reference to the example eight association rules above, there are seven other association rules that correlate a value in the first field as a condition, so the result of the step S6 inquiry would be affirmative. The rule under examination would continue to be scrutinized in step S7.

In step S7 it is checked whether all of the other association rules identified is step S6 correlate the first field with a third value in the second field (as opposed to correlating the first field with the second value in the second field). Reference is made again to the example eight association rules above, with the first rule being checked. The seven other association rules correlate a value in the first field with a third value in the second field, the third value being "15 percent" as opposed to "20 percent" for the rule being checked. Thus, the result of the step S7 inquiry is affirmative, and the rule is deemed suspicious. (Step S8.)

As discussed above, any other association rules found may also checked beginning at step S3 to determine whether they might be suspicious. After the last association rule under scrutiny is either deemed suspicious (step S8) or not suspicious (step S4), this method ends. It is also understood that, in implementations of the present method, the user may select and later revise the values of the first, second, and third predetermined minimum numbers as desired, for example, as expected to produce useful results based on empirical experience or on guidance provided by others.

Figure 5:
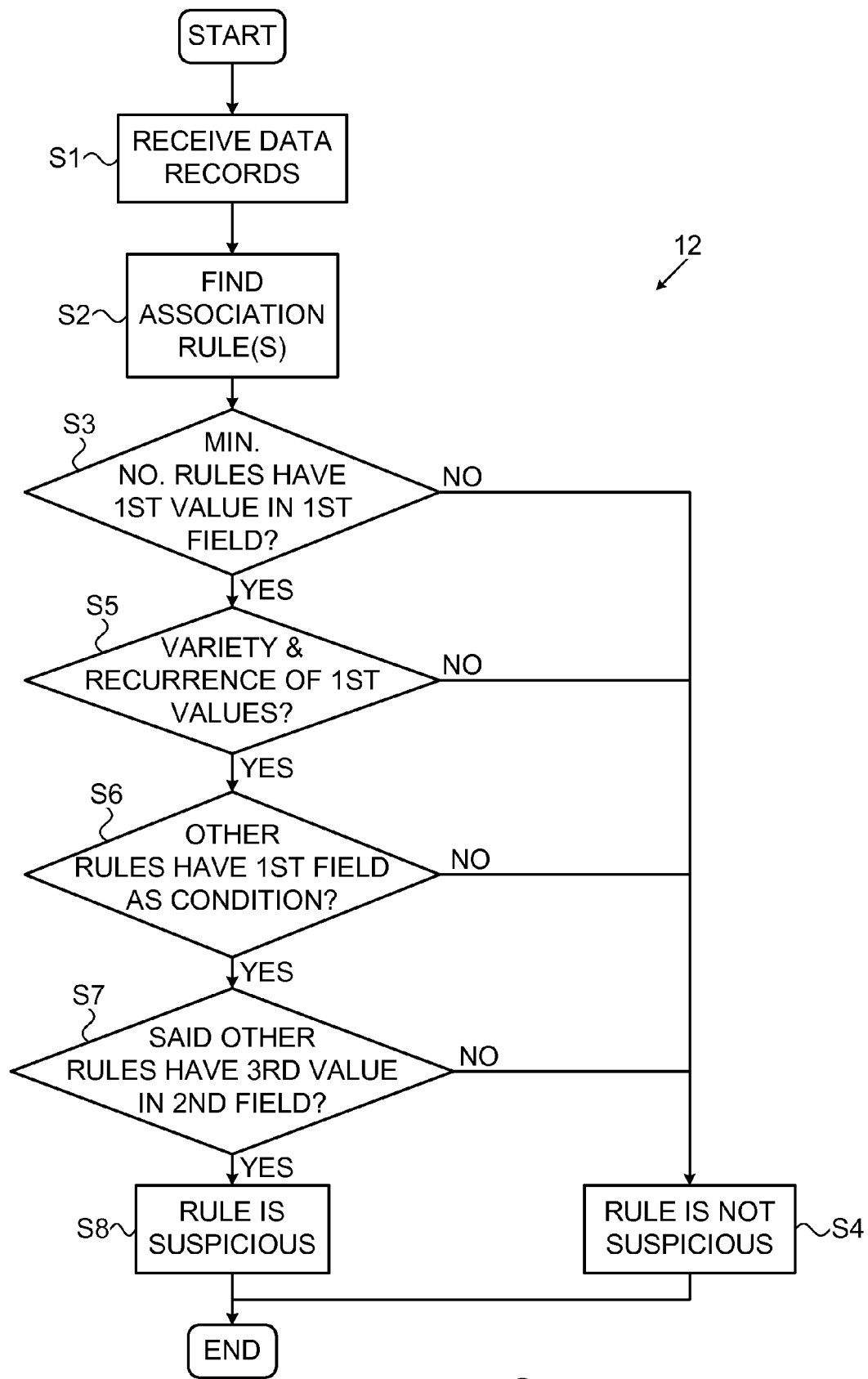
FIG. 5 presents a flowchart used to describe another example of the invention embodied as a method.

The above examples in the discussion of the method of FIG. 5 (as in the major portion of the discussion of the method of FIG. 3) use alpha-numeric strings as values in the first fields, but the method may also be implemented when the values in the first field are real numbers (as is the case for the second field in the present examples). Segmentation is performed as discussed above.

Figure 6:
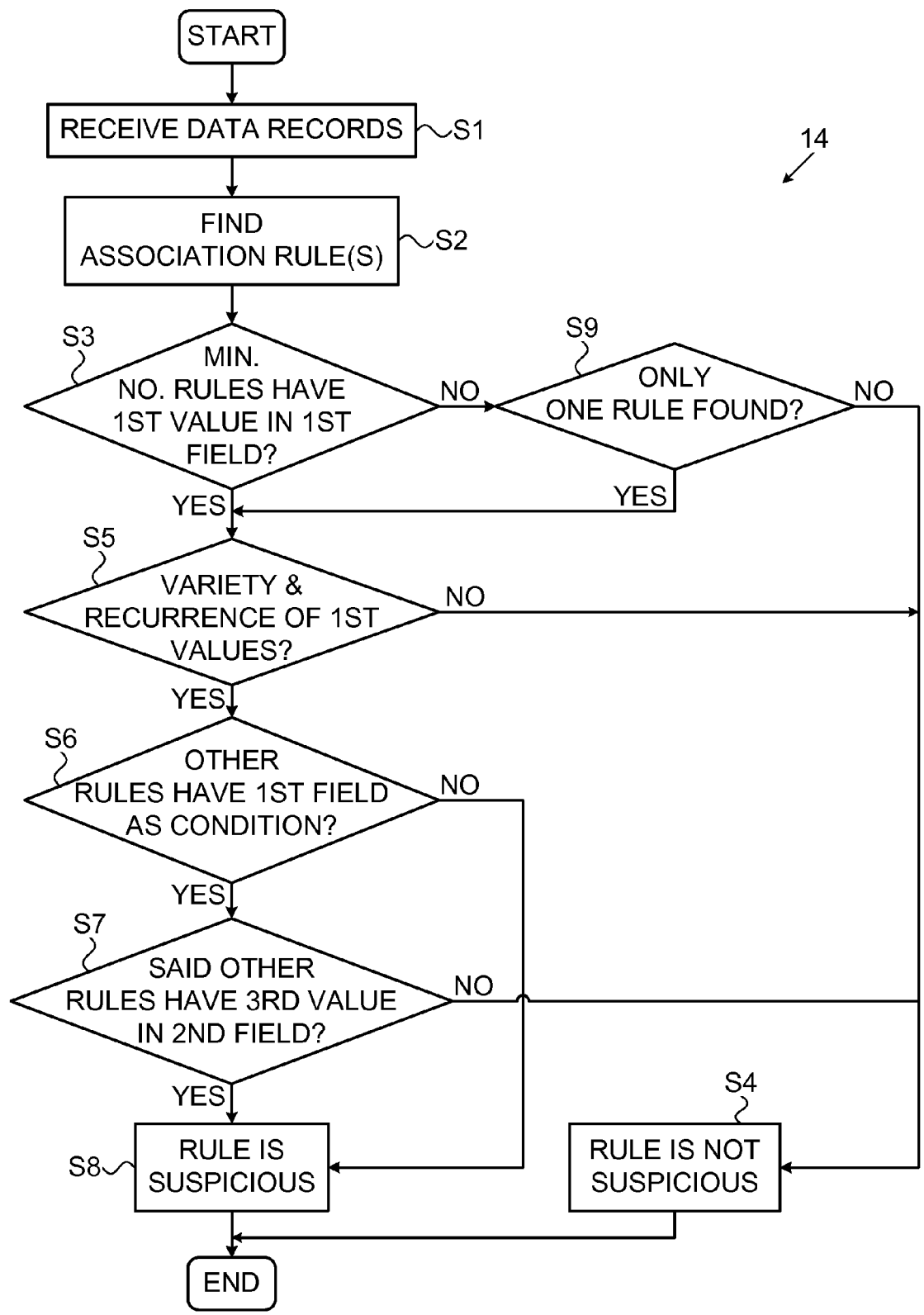
FIG. 6 presents a flowchart used to describe still another example of the invention embodied as a method.

The invention may also be embodied as a method that combines both the analyses of those described above with reference to FIGS. 3 and 5. This method is described with reference to the flowchart 14 of FIG. 6.

In this method, the first and second steps S1 and S2 are the same as steps S1 and S2 in FIG. 5. After step S2, though, the method of FIG. 6 differs. That is, an association rule not deemed suspicious after the analysis of FIG. 5 may be deemed suspicious the present method if it correlates the first value in the first field with the second value in the second field, if no other association rules are found that correlate any value in the first field with a value in the second field. As for the previously-discussed methods, the steps that follow step S2 need to be performed for each association rule found (in step S2) in order to determine whether the particular association rule is suspicious. For clarity of drawing, though, the steps following step S2 are represented only once in FIG. 5.

The inquiry of step S3 is the same as that of step S3 in the method of FIG. 5, but the result of a negative answer differs. That is, in step S3 (of the present method) it is inquired as to whether at least a first predetermined minimum number of other association rules are found that correlate the first value in the first field as a condition with any value in the second field as a result. If the result of the step S3 inquiry is negative, the process flows to step S9, where it is inquired as to whether the association rule under analysis is the only rule found that correlates the first value in the first field as a condition with any value in the second field as a result. If the result of the inquiry is negative, the rule at that point is deemed not suspicious (step S4), and the process ends for this rule. If the result of the inquiry is affirmative, the process flows to step S5.

Step S5 in this method, as in the method of FIG. 5, is an inquiry as to whether there is enough variety and enough recurrence of the first values in the first fields of the association rules found in step S2. That is, the method progresses with an inquiry as to whether there exist at least a second predetermined minimum number of different alpha-numeric strings or segments of real numbers in the first fields of the data record and, for each of those strings or segments, there exist at least a third predetermined minimum number of records having in the first field the particular string or real numbers of the segments of the rule under examination, respectively. If the values in the first field are real numbers instead of alpha-numeric strings, they are segmented as discussed above regarding the embodiment of FIG. 3. If the result of the inquiry is negative, the rule is deemed not suspicious (step S4), and the analysis for that rule ends. If the result of the inquiry is affirmative, the process flow continues to a step S6.

Step S6 in this method, as also in the method of FIG. 5, is an inquiry as whether other association rules are found that correlate a value in the first field as a condition. If the result of the inquiry is negative, the rule is deemed suspicious (step S8), and the process ends for this rule. (This result differs from that of the step S6 inquiry in the embodiment of FIG. 5, because an affirmative response to the inquiry of step S9 keeps an extra category of rules under scrutiny.)

If the result of the step S6 inquiry is affirmative, the process flows to step S7, where it is checked whether all of the other association rules found in step S6 (the other rules that correlate a value in the first field as a condition) correlate the first field with a third value in the second field (as opposed to correlating the first field with the second value in the second field). Reference is made again to the example eight association rules above, with the first rule being checked. The seven other association rules correlate a value in the first field with a third value in the second field, the third value being "15 percent" as opposed to "20 percent" for the rule being checked. Thus, the result of the step S7 inquiry is affirmative, and the rule is deemed suspicious. (Step S8.) If instead the result of the step S7 inquiry were negative, the rule would be deemed not suspicious. (Step S4.) After each association rule found has reached either step S4 or step S8, the method of FIG. 6 ends.

In this embodiment, a rule is deemed suspicious if it meets one of two criteria. The first criterion applies to rules relating two fields, and the records of the dataset have multiple values for the fields. For such a dataset, a rule is deemed suspicious if it is the only rule relating the two fields. The second criterion for deeming a rule suspicious applies when multiple rules for the dataset relate two fields, but all the other rules have same result, which differs from the result of the rule under analysis.

Figure 7:
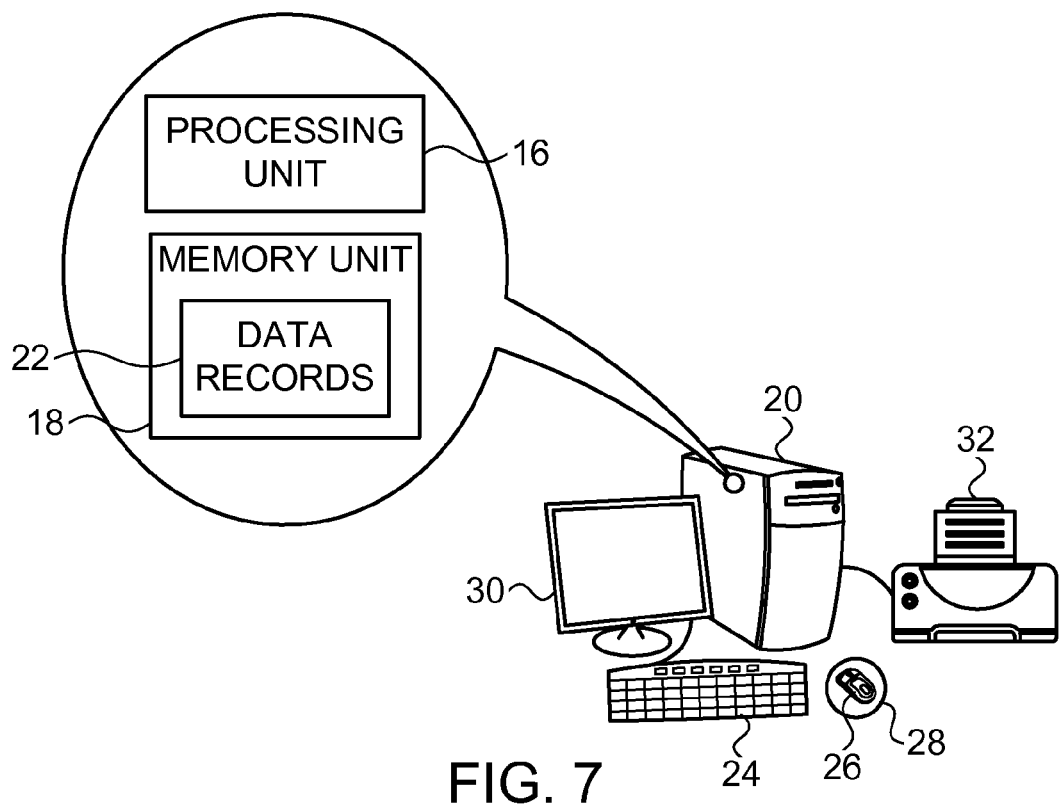
FIG. 7 provides a block diagram of an example of the invention embodied as a system.

The invention may also be embodied as a system for processing data records to discover a suspicious association rule. This system, described with reference to FIG. 7, includes a processing unit 16 and a memory unit 18. The processing unit 16 and the memory unit 18 may be components of a single personal computer 20 or work station. The memory unit 18 stores data records 22. The processing unit 16 may be an Intel Pentium Processor E5400, an Intel Xeon 5130 CPU, or any other equivalent means for processing (executing) instructions. The memory unit 18 may be a SATA hard drive, a flash memory SSD (solid state drive), CD, DVD, USB flash drive, or any other equivalent means for storing data records and/or instructions. A user may enter input using a keyboard 24 and a mouse 26 on a mouse pad 28, as is known in the art, and the user may view output on a display 30 or from a printer 32, also as are known in the art.

The memory unit 18 holds instructions that, when executed by the processing unit 16, cause the processing unit 16 to receive the data records 22 that had been stored on the memory unit 18, to analyze the data records to find association rules, and to indicate which if any association rules are suspicious. The instructions may be such that cause the system to execute the methods of FIG. 3, 5, or 6, including the alternative embodiments discussed above.

Figure 8:
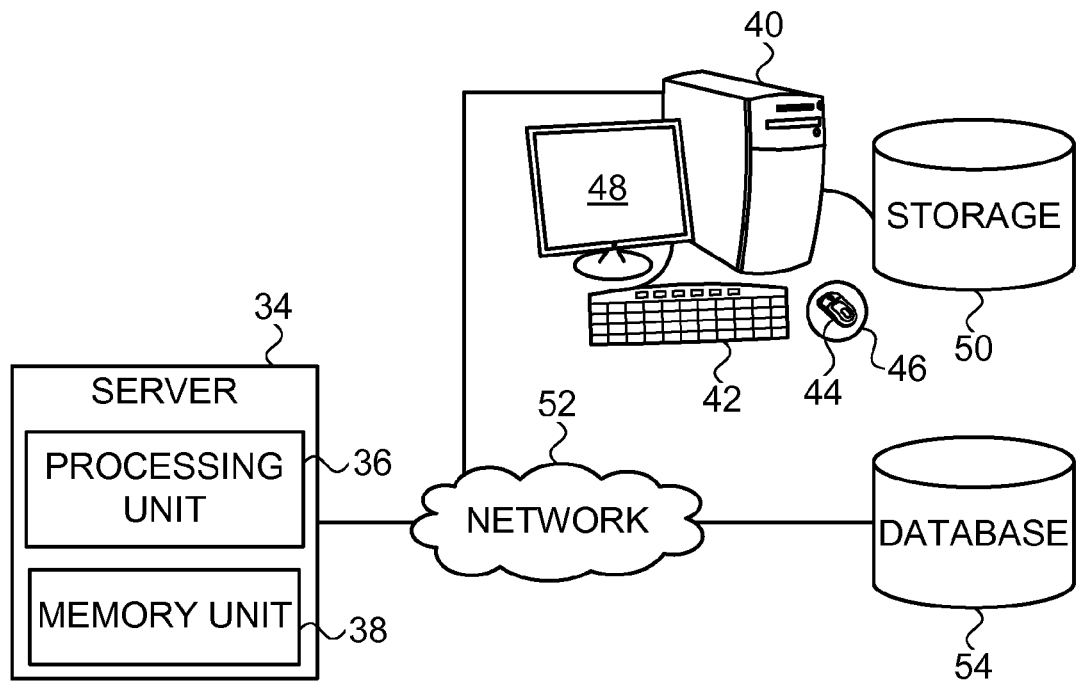
FIG. 8 provides a block diagram of another example of the invention embodied as a system.

An alternate implementation of the system is illustrated in FIG. 8 as a server 34. The server 34 has a processing unit 36 and a memory unit 38, which function analogously to the processing unit 16 and the memory unit 18, respectively, of the personal computer 20 of FIG. 7. As non-limiting examples, the server 34 may be any server that runs Windows. The memory unit 38 stores instructions that may be such that cause the system to execute the methods of FIG. 3, 5, or 6, including the alternative embodiments discussed above.

To find suspicious association rules, a user accesses the server 34 using a personal computer 40 or workstation, which he/she controls using, for example, a keyboard 42 and a mouse 44 on a mouse pad 46. The user may see results using, for example, a display 48 operatively connected to the personal computer 40. The personal computer has storage 50. The user operating the personal computer 40 accesses the server 34 via a network 52, such as a LAN or the Internet, as non-limiting examples.

The user selects which data records to analyze. The data records could be stored in the storage 50 of the personal computer 40, or alternatively the data records may be stored on a separate database 54, which is accessible to the user operating the personal computer 40 via the network 52. In either case, the data records need to be transferred to the server 34 via the network 52 in order for the server 34 to receive and analyze the data records to find association rules and to indicate whether they are suspicious.

The invention may further be embodied as a machine readable storage medium. The storage medium may be a hard drive, such as SATA hard drive or a flash memory SSD. Alternatively, the storage medium may be a CD, a DVD, or a USB flash drive. The storage medium is non-transitory, as opposed to transitory, such as a carrier wave.

The storage medium of this embodiment holds instructions that, when executed, cause the receipt of data records (by a processor), the analysis of those data records to find association rules, and the indication of which if any of the association rules are suspicious. The instructions may be such that cause the execution of the methods of FIG. 3, 5, or 6, including the alternative embodiments as discussed above. Hence, the storage medium could even be the memory unit 18 of FIG. 7 or the memory unit 38 of FIG. 8.

Having thus described exemplary embodiments of the invention, it will be apparent that various alterations, modifications, and improvements will readily occur to those skilled in the art. Alternations, modifications, and improvements of the disclosed invention, though not expressly described above, are nonetheless intended and implied to be within spirit and scope of the invention. Accordingly, the foregoing discussion is intended to be illustrative only; the invention is limited and defined only by the following claims and equivalents thereto.

What is claimed is:

1. A method of operating a data processor to process data records to discover a suspicious association rule, the method comprising:
   receiving data records that had been stored on a data storage device, the data records having at least a first field and a second field;
   analyzing the data records to find at least one association rule; and
   for an association rule found that correlates a first value in the first field of a record as a condition with a second value in the second field of the record as a result, indicating that the association rule is suspicious if:
      only one or at least a first predetermined minimum number of other association rules are found having the first value in the first field;
      there exist at least a second predetermined minimum number of different alpha-numeric strings or segments of real numbers in the first field and, for each of those strings or segments, there exist at least a third predetermined minimum number of records having in the first field the string or the real numbers of the segments, respectively;
      other association rules are found that correlate a value in the first field as a condition; and
      all of said other association rules correlate the first field with a third value in the second field.

2. The method of claim 1, wherein the association rule found correlating the first value in the first field with the second value in the second field is indicated as suspicious if no other association rules are found that correlate any value in the first field with a value in the second field.

3. The method of claim 1, wherein the values in the first field and/or the second field are real numbers.

4. The method of claim 1, wherein the data records are received from the data storage device through a network.

5. A system for processing data records to discover a suspicious association rule, the system comprising:
   a processing unit; and
   a memory unit holding instructions that, when executed by the processing unit, cause the processing unit to
      a. receive data records that had been stored on a data storage device, the data records having at least a first field and a second field;
      b. analyze the data records to find at least one association rule; and
      c. for an association rule found that correlates a first value in the first field of a record as a condition with a second value in the second field of a record as a result, indicate that the association rule is suspicious if:
         only one or at least a first predetermined minimum number of other association rules are found having the first value in the first field;
         there exist at least a second predetermined minimum number of different alpha-numeric strings or segments of real numbers in the first field and, for each of those strings or segments, there exist at least a third predetermined minimum number of records having in the first field the string or the real numbers of the segment, respectively;
         other association rules are found that correlate a value in the first field as a condition; and all of said other association rules correlate the first field with a third value in the second field.

6. The system of claim 5, wherein the association rule found correlating the first value in the first field with the second value in the second field is indicated as suspicious if no other association rules are found that correlate any value in the first field with a value in the second field.

7. The system of claim 5, wherein the values in the first field and/or the second field are real numbers.

8. The system of claim 5 further comprising:
the data storage device that stores the data records.

9. A non-transitory machine readable storage medium containing instructions associated with discovering suspicious association rules, the instructions when executed causing the following:
receiving data records that had been stored on a data storage device, the data records having at least a first field and a second field;
analyzing the data records to find at least one association rule; and
for an association rule found that correlates a first value in the first field of a record as a condition with a second value in the second field of the record as a result, indicating that the association rule is suspicious if:
only one or at least a first predetermined minimum number of other association rules are found having the first value in the first field;
there exist at least a second predetermined minimum number of different alpha-numeric strings or segments of real numbers in the first field and, for each of those strings or segments, there exist at least a third predetermined minimum number of records having in the first field the string or the real numbers of the segments, respectively;
other association rules are found that correlate a value in the first field as a condition; and
all of said other association rules correlate the first field with a third value in the second field.

10. The non-transitory machine readable storage medium of claim 9, wherein the association rule found correlating the first value in the first field with the second value in the second field is indicated as suspicious if no other association rules are found that correlate any value in the first field with a value in the second field.

11. The non-transitory machine readable storage medium of claim 9, wherein the values in the first field and/or the second field are real numbers.

* * * * *